US011184287B2

(12) United States Patent
Engelen

(10) Patent No.: US 11,184,287 B2
(45) Date of Patent: Nov. 23, 2021

(54) METHOD FOR TRANSMISSION WINDOW OPTIMIZATION BY TRANSMITTING DEVICES SUCH AS MODEMS COMMUNICATING WITH SATELLITES BY ADAPTING TRANSMITTING BEHAVIOR TO THEIR LOCATION

(71) Applicant: Maarten Johannes Engelen, Amsterdam (NL)

(72) Inventor: Maarten Johannes Engelen, Amsterdam (NL)

(73) Assignee: HIBER B.V., Amsterdam (NL)

( * ) Notice: Subject to any disclaimer, the term of this patent is extended or adjusted under 35 U.S.C. 154(b) by 0 days.

(21) Appl. No.: 15/982,198

(22) Filed: May 17, 2018

(65) Prior Publication Data
US 2019/0230040 A1 Jul. 25, 2019

(30) Foreign Application Priority Data
Jan. 19, 2018 (NL) ...................... 2020299

(51) Int. Cl.
*H04B 7/185* (2006.01)
*H04L 12/807* (2013.01)

(52) U.S. Cl.
CPC .......... *H04L 47/27* (2013.01); *H04B 7/1851* (2013.01); *H04B 7/18513* (2013.01); *H04B 7/18519* (2013.01); *H04B 7/18543* (2013.01)

(58) Field of Classification Search
CPC .............. H04B 7/1851; H04B 7/18513; H04B 7/18519; H04B 7/18543; H04B 47/27
See application file for complete search history.

(56) References Cited

U.S. PATENT DOCUMENTS

| 5,799,256 A | 8/1998 | Pombo et al. |
| 6,900,757 B1 | 5/2005 | Dimitrov et al. |
| 2002/0082774 A1* | 6/2002 | Bloebaum ............ G01S 5/0027 701/468 |
| 2002/0160773 A1* | 10/2002 | Gresham ........... H04B 7/18506 455/431 |
| 2008/0253311 A1* | 10/2008 | Jin ....................... H04B 1/662 370/311 |
| 2009/0224876 A1 | 9/2009 | McCall et al. |

(Continued)

FOREIGN PATENT DOCUMENTS

EP 1890444 A2 2/2008

OTHER PUBLICATIONS

European Patent Office Search Report, pp. 1-6 (dated Jun. 17, 2019).

*Primary Examiner* — Anez C Ebrahim
(74) *Attorney, Agent, or Firm* — Jordan IP Law, LLC; Todd A. Vaughn

(57) ABSTRACT

A method for determining an optimized transmission window having a first start time and a first end time, for transmitting data from a device to a relay station travelling with respect to one another. The optimized transmission window is determined by the device listening during at least part of the travelling. The device determines the optimized transmission window by starting a receiving mode for receiving a signal from the relay station, setting the first start time when receiving the signal, stopping the receiving mode when reception of the signal stops, and setting the first end time.

9 Claims, 3 Drawing Sheets

(56) References Cited

U.S. PATENT DOCUMENTS

Figure 1:
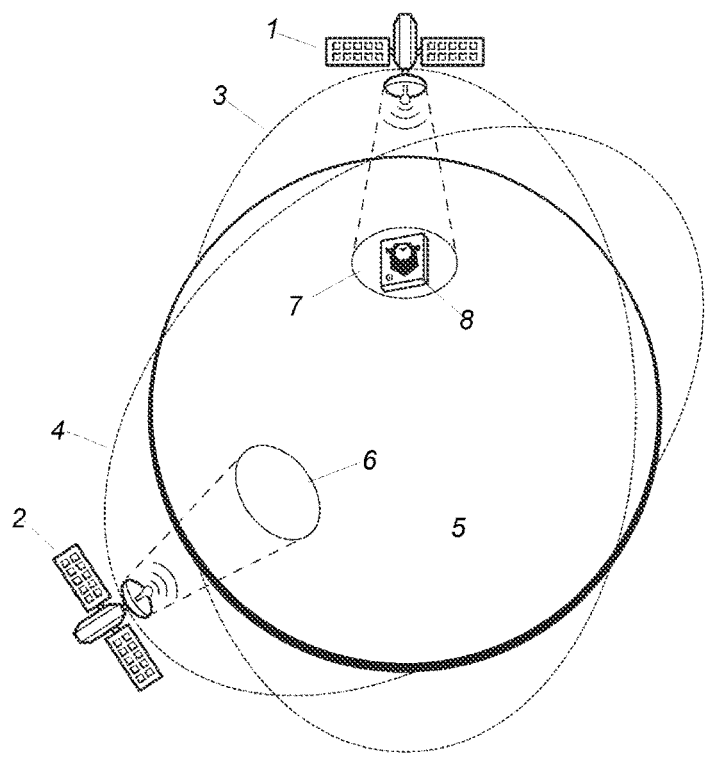

2010/0120434 A1* 5/2010 Hasegawa ............. H04W 36/02
455/436
2016/0345189 A1* 11/2016 Miyagawa ......... H04B 7/18517
2019/0044611 A1* 2/2019 Treesh ................. H04B 7/2041

* cited by examiner

METHOD FOR TRANSMISSION WINDOW OPTIMIZATION BY TRANSMITTING DEVICES SUCH AS MODEMS COMMUNICATING WITH SATELLITES BY ADAPTING TRANSMITTING BEHAVIOR TO THEIR LOCATION

CROSS-REFERENCE TO RELATED APPLICATIONS

The present application claims priority under 35 U.S.C. § 119 to Dutch Patent Application No. NL 2020299 (filed on Jan. 19, 2018), which is hereby incorporated by reference in its complete entirety.

TECHNICAL FIELD

Embodiments of the invention relate to a method for determining an optimized transmission window, a device for transmitting data to a relay station, and data acquisition system.

BACKGROUND

Monitoring the world is due to the availability of a wide variety of sensors a rapidly growing market. The data from sensors is transmitted over networks and gathered to deduct valuable information.

U.S. Pat. No. 5,799,256, according to its abstract, describes "A method and apparatus reduces power consumption in a portable communication device (104) by predicting a user's location, movement and actions. The portable communication device (104) is powered by a battery (120) and includes a battery control (122) for decoupling portions of the communication device (104) from the battery. Historical records of control channel and call activity are maintained in memory (117) at the communication device (104). This data is used to predict calls. This permits the communication device (104) to conserve power in the battery (120) when no call activity is likely. The stored data is also used to predict what control channels should be scanned to search for a nearby base station (102). This permits the communication device (104) to scan a reduced number of control channels and reduces the time duration necessary for powering up the receiver (108) of the communication device (104)."

U.S. Pat. No. 6,900,757, according to its abstract, describes "The method for identification of a set of satellites, arranged on GEO orbit, consists of receiving satellite signals; determining antenna beams strength; detecting beams that are local maximums according to the antenna structure, defined by the number of beams and their coordinates in the antenna plane; and approximating the GEO orbit using the strength of the received signals, wherein the satellites' identification is carried out through the local maximums situated on or in a defined range of the approximated GEO curve, according to the information for the geographic position of each satellite and the antenna orientation. Projection probability coefficients of a given satellite in a given area of the antenna plane are used for satellites' identifications. The information about the geographic position of each satellite may be corrected by azimuth, elevation and roll angles, according to the inaccuracy of the antenna installation. It is possible after detection of the strength of each beam to introduce a correction, reflecting the signal-to-noise ratio. In this case, it is expedient to amplify the signals corresponding to the received signals' strengths by the square or bi-square law."

SUMMARY

The device according to the invention has many advantages because it offers less complexity and therefore requires less computing and less energy. In addition, it is easy to implement and removes the necessity to retain historical records of network activity to optimize network communication. Nevertheless, the invention accuracy is often out performing current solutions. The invention optimizes the transmission windows and allows transmitting device to save energy and deliver a better Quality of Service (QoS).

To that end, the invention provides a method for determining an optimized transmission window having a first start time t1 and a first end time t2, for transmitting data from a device to a relay station travelling with respect to one another, wherein said optimized transmission window is determined by said device listening during at least part of said travelling, wherein said device determines said optimized transmission window by: starting a receiving mode for receiving a signal from said relay station; setting said first start time t1 when receiving said signal; stopping said receiving mode when reception of said signal stops, and setting said first end time t2.

In this respect, travelling relates to going from a first position to a second position. This is also referred to as displacing, i.e., going from one place or location to another. In particular, the device, the relay station, or both, follow a trajectory. Such a trajectory may be periodic. In an embodiment, the relay station is in an orbit around for instance the earth, the moon, or another celestial body. The device and/or the relay station may go along, or follow, a track or path.

Information such as tracking of powered and unpowered assets, such as the position of fishing vessels, railcars, trailers, machines or assets that cannot move by themselves but of which the location is often lost or unknown, such as large equipment, mobile toilets, etc. Also monitoring of external conditions such as in smart agriculture, where soil status is measured for yield optimization, or climate stations. Terrestrial networks are often not available and can take a long time to create. Due to the introduction of low cost satellites and especially low earth orbit satellites, satellite networks become more and more popular to distribute data over the earth. A trend not only for rural areas, where terrestrial networks are unavailable, but also for other areas where there is a need for a quick and easy way to provide data distribution. Sensor data in particular, is suited for distribution by low cost satellite networks with limited bandwidth, since, in general, this kind of data comprises relatively small data packages. In addition sensor data updates often don't need to be sent every minute, and can be sent every few hours, for example to track a vehicle or even once per year, for example to track the position of a coastline. Also there are sensors that have a notification function and only need to transmit data when an event occurs, for example when the content of a tank drops below a threshold. Satellites are objects orbiting celestial bodies, such as the earth.

In an embodiment, the optimized transmission window exists during a part of said travelling and is at least a part of an expected transmission window that has a second start time t0 and a second end time t3, wherein said listening starts at said second start time t0.

In an embodiment, said listening is repeatedly done during time intervals of limited duration in order to reduce power consumption and safe battery.

In an embodiment, the expected transmission window is periodically. In a particular embodiment, the transmission window is regular periodic, i.e., at regularly occurring intervals, for instance every 90 minutes.

In an embodiment, the expected transmission window is determined using window information selected from a device absolute device position, a device displacement, a device trajectory, an elevation angel, a relay station displacement, a relay station trajectory, and a combination thereof.

In an embodiment, the window information is received from said relay station or a further relay station.

In an embodiment, the relay station is a satellite orbiting a celestial body.

In an embodiment, data regarding a current position of said device is retrieved, in an embodiment from a global positioning system working in said device.

The invention further relates to a device for transmitting data to a relay station while said relay station and said device travel with respect to one another, said device comprising at least one sensor providing measurement data, a data processor that is functionally coupled to said sensor, a data transmitter for transmitting said measurement data to said relay station outside said device, and software which, when running on said device, performs the method described above of one of the embodiments described above for determining said transmission window for transmitting said measurement data to said relay station.

A sensor can for instance comprise a camera, sensors for climate conditions like humidity, temperature, light level, carbon dioxide, other gasses, air pressure, but also for physical parameters like conductivity, for organic entities like bacteria and viruses, for composition of liquid chemical compounds.

In an embodiment, the device comprises an initiation mode and an operational mode, wherein in said initiation mode said device determines said optimized transmission window, and after said initiation mode said device enters said operational mode, wherein said software controls said initiation mode and said operational mode.

In an embodiment, in the operational mode said device comprises a low power mode and a high power mode, wherein in said low power mode said device has a lower power consumption than in said high power mode, and wherein when said device is outside said optimized transmission window said device is in said low power mode. This can limit the power usage considerably.

In an embodiment, in part of said optimized transmission window said device is in said low power mode. This can further limit the power usage considerably.

In an embodiment, in said high power mode said device performs at least one selected from sending data to said relay station, receiving data from said relay station, and a combination thereof.

In an embodiment, the device is self-containing. In such an embodiment, the device comprises a battery. In an embodiment, the device fits within a space of 15×15×15 cm. In a particular embodiment, the device can fit within a space of 3×5×1 cm.

In an embodiment, the device comprises a housing further holding a power source. Such a power source may comprise a battery or for instance a photovoltaic unit. The housing in an embodiment further comprises an antenna for transmitting and receiving data.

The invention further relates to a data acquisition system comprising a relay station, a server and at least one device as described in one of the embodiments, wherein said at least one device and said relay station travel with respect to one another and said relay station transmits data derived from said measurement data to said server.

A server may comprise a dedicated server device, a system of servers, a cloud-based server, a distributed server, and the like.

In an embodiment, in the data acquisition system, in said relay station travels with respect to said server.

In an embodiment, the data acquisition system comprises a plurality of said devices, wherein said devices are functionally stationary with respect to one another.

The invention further pertains to a computer program product for determining an optimized transmission window having a first start time t1 and a first end time t2, for transmitting data from a device to a relay station travelling with respect to one another, wherein when running on a data processor, said computer program product performs said method of any one of the embodiments above.

For instance, a modem according the invention that communicates with satellites has a scheduling system to only send data when a satellite is in view. This saves power. The modem is able to be in an 'off' state most of the time this way which extends battery lifetime. The modem receives up to date satellite data through the broadcast link that satellites repeatedly send to inform the network on the current status. The modem has an algorithm on board that predicts when the next satellite will come over and sleep until that time. The modem has GPS on board so always know where it is. This algorithm can also incorporate acceptable elevation angles (angle from ground to the satellite) and compass directions. So this allows the modem to modify its sending behavior based on its environment. Also the modem can learn which elevation angles and compass directions are available in an unsupervised way by regularly checking when satellites come over, from which direction and under which elevation angle the broadcast signal should come in and by this way slowly learn when it can and cannot send. For a stationary modem this can allows an even longer battery time when there are problems with line of sight to the satellite in certain circumstances, e.g. the line of sight is partially blocked and not used by the modem.

The invention further relates to objects that limit their power consumption and require data transmission, at certain time intervals, with a relay object that forwards the data of the data transmission to a server for further processing. These objects can be found on earth or any other celestial body.

The term "substantially" when used herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

DRAWINGS

Embodiments of the invention will now be described, by way of example only, with reference to the accompanying schematic drawings (which are not necessarily on scale) in which corresponding reference symbols indicate corresponding parts, and in which:

FIG. 1. illustrates a modem and low earth orbit satellites orbiting earth and their transmission footprint.

Figure 2:
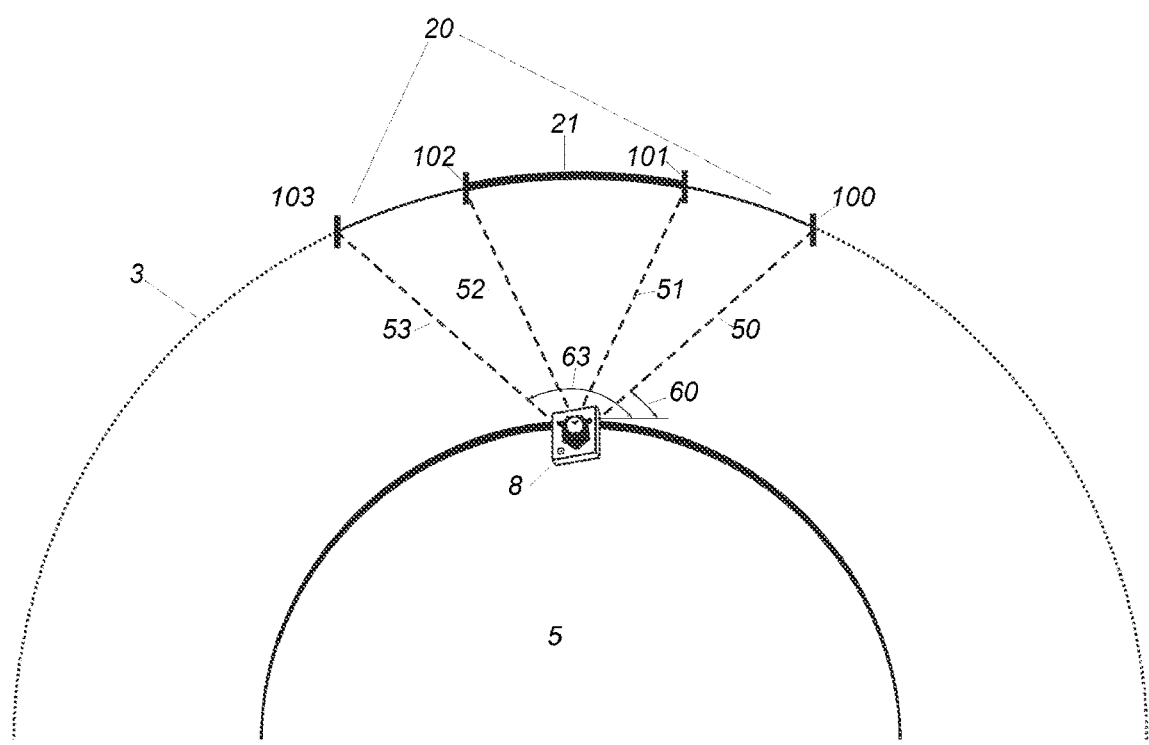

FIG. 2. illustrates how to set the optimized transmission window for a modem and a satellite based on an expected transmission window.

Figure 3:
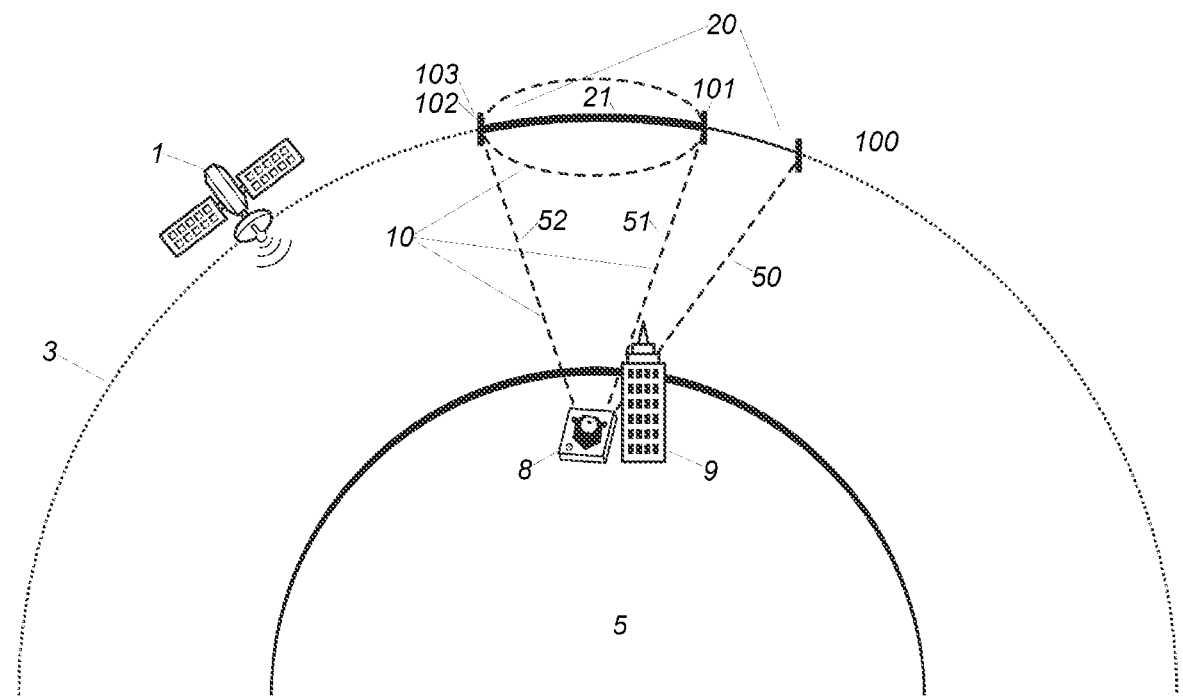

FIG. 3. illustrates an optimized transmission window for a modem and a satellite when there is a nearby obstacle.

Figure 4:
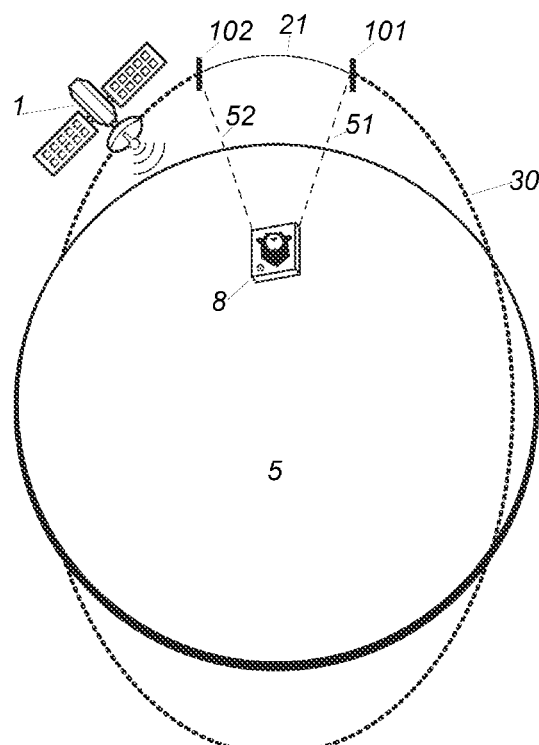

FIG. 4. illustrates the low power mode of an embodiment.

Figure 5:
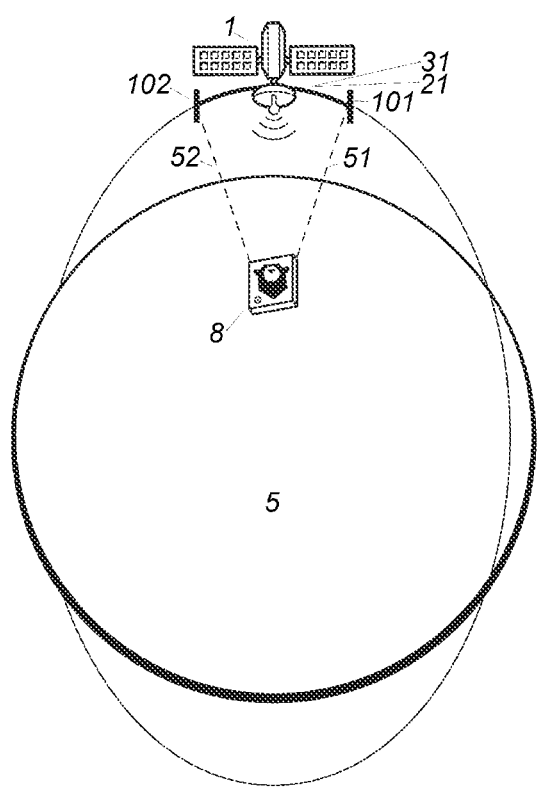

FIG. 5. illustrates the high power mode of an embodiment.

DESCRIPTION

The current figures relate to an embodiment where one or more of the current device is positioned on the earth and one or more relay stations circling the earth. Other similar embodiments can be thought of. A device does not need to be stationary. Many devices can be deployed in an area. The relay station can for instance comprise any vehicle, including a drone. These relay stations can have a trajectory that pass the device frequently, for instance with regular time intervals.

FIG. 1 illustrates a first low earth orbit satellite 1 orbiting earth 5 along a first trajectory 3, and a second low earth orbit satellite 2 orbiting earth 5 along a second trajectory 4. The satellites 1, 2, are examples of a current relay station. Both satellites 1, 2, are broadcasting or send signals to earth 5, and project their own transmission footprint 6, 7 on earth 5. A modem 8, an embodiment of a device according to the invention, is depicted within first footprint 7 of the first low earth orbit satellite 1. When there are no obstacles and while in first footprint 7, modem 8 is to communicate with first low earth orbit satellite 1. As depicted, modem 8 is not to communicate with second low earth orbit satellite 2 since it is not in the second footprint 6 of second low earth orbit satellite 2. At another time, depending upon the second trajectory 4, and thus, the path of second footprint 6, modem 8 can be within the second footprint 6 and be able to communicate with second low earth orbit satellite 2. Also, modem 8 can be moved to the path of second footprint 6 and be enabled to communicate with second low earth orbit satellite 2.

FIG. 2 illustrates the setting of a time frame of an optimized transmission window 21 for modem 8 and first low earth orbit satellite 1 (not illustrated, outside the scope of FIG. 2). The optimized transmission window 21 is depicted as a thick line.

In first trajectory 3 at time 100 (=t0), first low earth orbit satellite 1 sends a first signal 50 that is not received by modem and marks the start of an expected transmission window 20 for modem 8 and first low earth orbit satellite 1. The expected transmission window 20 is depicted as a thin line and includes the thick line of the optimized transmission window 21.

In first trajectory 3 at time 101 (=t1), first low earth orbit satellite 1 sends a second signal 51 that is the first signal received by modem 8 and sets the start of the optimized transmission window 21.

In first trajectory 3 at time 102 (=t2), first low earth orbit satellite 1 sends a third signal 52 that is the last signal received by modem 8 and sets the end of the optimized transmission window 21.

In first trajectory 3 at time 103 (=t3), first low earth orbit satellite 1 sends a fourth signal 53 that is not received by modem and marks the end of an expected transmission window 20.

At modem 8 there is an elevation angle 60 between the ground and first signal 50. Similarly, there is an elevation angle 63 between the ground and fourth signal 53. The angle 50 is a known angle, which allows the modem to receive the first signal from first low earth orbit satellite 1, thus gaining reception, under ideal circumstances when there are no obstacles and there is no atmospheric disturbance. The angle 63 is a known angle, which allows the modem to receive the last signal from first low earth orbit satellite 1, thus loosing reception when the angle get bigger, under ideal circumstances when there are no obstacles and there is no atmospheric disturbance. These angles shift over time when first trajectory 3 changes or when the modem is placed on a moving object.

In a further embodiment, the modem 8 comprises a global positioning system, allowing the modem to determine its position.

FIG. 3 illustrates the time frame of an optimized transmission window 21 is shown for modem 8 close to an obstacle 9, and a first low earth orbit satellite 1. The optimized transmission window 21 is depicted as a thick line.

In first trajectory 3 at time 100 (=t0), first low earth orbit satellite 1 has sent a first signal 50, at the start of an expected transmission window 20, that is not received by modem 8 because of an obstacle 9.

In first trajectory 3 at time 101 (=t1), first low earth orbit satellite 1 has sent a second signal 51 that is the first signal received by modem 8, thus modem 8 gained reception, and is the start of the optimized transmission window 21.

In first trajectory 3 at time 102 (=t2), first low earth orbit satellite 1 has sent a third signal 52 that is the last signal received by modem 8, thus after modem 8 lost reception, and is the end of the optimized transmission window 21.

In this example time 102 and time 103 (=t3) are the same therefore the end of the optimized transmission window 21 equals the end of expected transmission window equals 20.

During the optimized transmission window 21 modem 8 sends data to first low earth orbit satellite 1 as depicted by the cone shape in dash line FIG. 10.

FIG. 4 illustrates a low power mode time frame 30 for modem 8, starting after time 102 (=t2) when the optimized transmission window 21 ends, and ending before time 101 (=t1 when the optimized transmission window 21 starts. The low power mode time frame 30 is depicted as a thick dash line.

In another embodiment, while orbiting earth 5, modem 8 can stay longer in low power mode then during the low power mode time frame 30 and stay in low power mode also during the optimized transmission window 21. In the other embodiment, the modem 8 will get out of low power mode only when the modem is programmed to go in a high power frame mode time frame 31 as illustrated in FIG. 5. and when it is in an optimized transmission window 21.

FIG. 5 illustrates a high power mode time frame 31 for modem 8, starting at time 101 (=t1) when the optimized transmission window 21 starts, and ending at time 102 (=t2) when the optimized transmission window 21 ends. The high power mode time frame 31 is depicted as a thick line.

It is to be understood that the above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for determining an optimized transmission window for transmitting data from a device to a relay station travelling with respect to one another, the method comprising:
   listening, by said device, during at least part of said travelling;
   starting, by said device, a receiving mode for receiving a signal from said relay station;
   setting, by said device in response to receipt of a first signal from said relay station, a first start time t1 of said optimized transmission window;
   stopping, by said device, said receiving mode when reception of said signal stops; and
   setting, by said device in response to receipt of a second signal from said relay station, a first end time t2 of said optimized transmission window,
   wherein:
      said relay station is a low earth satellite orbiting a celestial body that projects a transmission footprint which comprises said optimized transmission window,
      said optimized transmission window exists during a part of said travelling and is at least a part of an expected transmission window that has a second start time t0 and a second end time t3,
      said listening starts at said second start time t0, and
      said expected transmission window is regularly periodic.

2. The method of claim 1, wherein said expected transmission window is determined using window information selected from a device absolute device position, a device displacement, a device trajectory, an elevation angle, a relay station displacement, a relay station trajectory, and a combination thereof.

3. The method of claim 2, wherein said window information is received from said relay station or a further relay station.

4. The method of claim 1, further comprising retrieving data regarding a current position of said device via a global positioning system in said device.

5. A device for transmitting data to a relay station while said relay station and said a device travel with respect to one another, said device comprising:
   at least one sensor providing measurement data;
   a data processor that is functionally coupled to said at least one sensor;
   a data transmitter for transmitting said measurement data to said relay station outside of said device; and
   software which, when running on said device, is to determine a transmission window for transmitting said measurement data to said relay station, said software configured to performs:
      setting said device to listen during at least part of said travelling;
      starting, by said device, a receiving mode for receiving a signal from said relay station;
      setting, by said device in response to receipt of a first signal from said relay station, a first start time t1 of said optimized transmission window when receiving said signal;
      stopping, by said device, said receiving mode when reception of said signal stops, and setting, by said device in response to receipt of a second signal from said relay station, a first end time t2 of said optimized transmission window, wherein:

said relay station is a low earth satellite orbiting a celestial body that projects projecting a transmission footprint which comprises said optimized transmission window,.

said optimized transmission window exists during a part of said travelling and is at least a part of an expected transmission window that has a second start time t0 and a second end time t3, said listening starts at said second start time to, said expected transmission window is regularly periodic, said device is configured to operate in an initiation mode, controlled by said software, in which said device determines said optimized transmission window; and an operational mode, controlled by said software, and entered after said initiation mode, said operational mode comprises: a low power mode in which said device has a low power consumption and is outside said optimized transmission window; and a high power mode in which said device has a high power consumption that is greater than said low power consumption, when said device is inside said optimized transmission window said device is in said low power mode, and in said high power mode, said device performs at least one selected from sending data to said relay station, receiving data from said relay station, and a combination thereof.

6. A data acquisition system, comprising:

a relay station;

a server; and at least one device for transmitting data to said relay station while said relay station and said device travel with respect to one another, said at least one device including:

at least one sensor providing measurement data;

a data processor that is functionally coupled to said at least one sensor;

a data transmitter for transmitting said measurement data to said relay station outside of said device; and software which, when running on said device, is to determine a transmission window for transmitting said measurement data to said relay station, said software configured to performs:

setting said device to listen during at least part of said travelling;

starting a receiving mode for receiving a signal from said relay station;

setting a first start time t1 of said optimized transmission window when receiving said signal;

stopping said receiving mode when reception of said signal stops, and setting, in response to receipt of a second signal from said relay station, a first end time t2 of said optimized transmission window, wherein:

said relay station is to transmit data derived from said measurement data to said server, said relay station is a low earth satellite orbiting a celestial body that projects a transmission footprint which comprises said optimized transmission window, said optimized transmission window exists during a part of said travelling and is at least a part of an expected transmission window that has a second start time t0 and a second end time t3, said listening starts at said second start time t0, and said expected transmission window is regularly periodic.

7. The data acquisition system according to claim 6, wherein said relay station travels with respect to said server.

8. The data acquisition system according to claim 6, wherein said at least one device comprises a plurality of said devices, wherein each device in said plurality of devices are functionally stationary with respect to other said devices.

9. A computer program product for determining an optimized transmission window having a first start time t1 and a first end time t2, for transmitting data from a device to a relay station travelling with respect to one another, said computer program product comprising a non-transitory computer readable medium, wherein when running on a data processor, said computer program product is to perform:

setting said device to listen during at least part of said travelling;

starting a receiving mode for receiving a signal from said relay station;

setting said first start time t1 in response to receipt of a first signal from said relay station;

stopping said receiving mode when reception of said signal stops, and setting said first end time t2 in response to receipt of a second signal from said relay station, wherein:

said relay station is a low earth satellite projecting a transmission footprint which comprises said optimized transmission window,.

said optimized transmission window exists during a part of said travelling and is at least a part of an expected transmission window that has a second start time t0 and a second end time t3, said listening starts at said second start time t0, and said expected transmission window is regularly periodic.

* * * * *